United States Patent [19]

Bliudnikas

[11] 4,121,225

[45] Oct. 17, 1978

[54] FACSIMILE RECORDING STYLUS

[75] Inventor: Kestutis E. Bliudnikas, North Grafton, Mass.

[73] Assignee: Alden Research Foundation, Westboro, Mass.

[21] Appl. No.: 777,044

[22] Filed: Mar. 14, 1977

[51] Int. Cl.² .............................................. G01D 15/06
[52] U.S. Cl. ............................. 346/139 C; 346/139 A
[58] Field of Search ............... 346/139 C, 139 A, 165

[56] References Cited

U.S. PATENT DOCUMENTS

| 2,879,129 | 3/1959 | Alden | 346/139 A |
| 4,060,815 | 11/1977 | Williams | 346/139 A |

*Primary Examiner*—Joseph W. Hartary
*Attorney, Agent, or Firm*—Grover and Meegan

[57] ABSTRACT

A stylus for attachment to a facsimile recording belt is formed of springy sheet metal such as stainless steel in the form of a foot with a toe bent downwardly from the end of the foot, and a leg extending upwardly at an angle over the toe to a recording surface. The leg has a cut-out portion intermediate the recording surface and a flexible hinge between the leg and the foot.

9 Claims, 6 Drawing Figures

FACSIMILE RECORDING STYLUS

BACKGROUND OF THE INVENTION

In one kind of facsimile recorder, for example as shown in U.S. Pat. Nos. 2,879,129 and 3,875,577 the recording paper is scanned by styli mounted on a belt travelling across the paper. The scanning styli usually cooperate with a blade-like electrode on the other side of the paper to mark the paper with electrical signals. A problem with such belt supported styli is to insure that each stylus flexes freely so as to maintain uniform marking pressure on the paper compressed between the stylus and the blade electrode despite the tendency of the stylus to bounce. An additional problem is to insure that the two or more styli on a belt are precisely equally spaced along the belt so that they can be accurately synchronized and phased with incoming electrical facsimile signals.

Accordingly it is one object of the present invention to improve the flexible tracking ability of a belt carried stylus. A further object is to provide very fine spacing adjustment of styli on the belt.

STATEMENT OF THE INVENTION

According to the invention a stylus for a facsimile recorder scanning belt comprises a foot portion of springy sheet metal for attachment to a scanning belt, a metal sheet leg integral with and extending from the foot at an angle thereto to a scanning surface, wherein the leg has an area of reduced cross section intermediate the foot and the scanning surface.

Further according to the invention the stylus foot portion includes means for attaching the stylus to a scanning belt and has a toe bent at an angle to the foot so as to adjust the lengthwise position of the stylus scanning surface with respect to the belt.

DRAWINGS

DESCRIPTION

Figure 1:
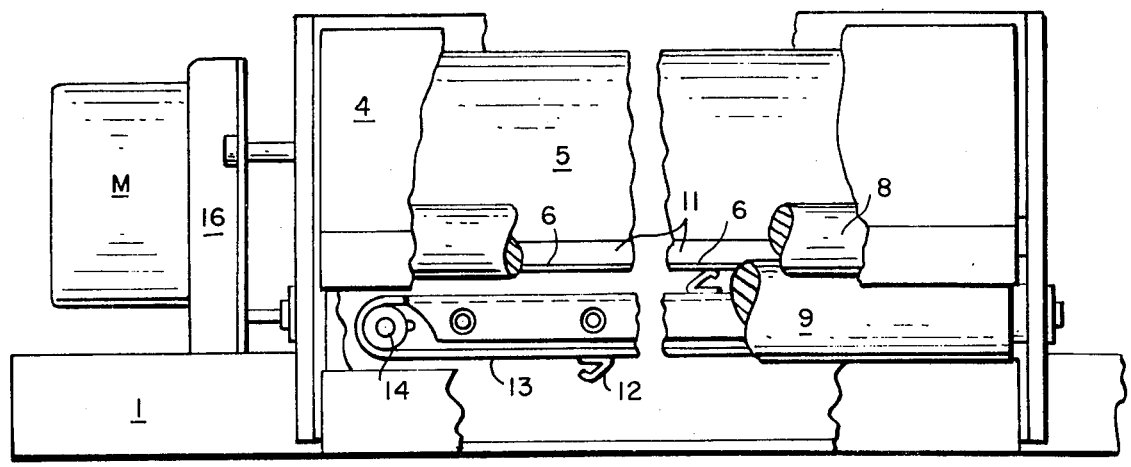
FIG. 1 is a front elevation of a facsimile recorder with belt carried styli according to the invention.

The facsimile recorder shown in FIG. 1 comprises a base 1, and end walls 2 supporting a housing 4 for a supply roll 6 of electrolytic recording web or paper. The recording paper 6 is drawn from the roll 5 by feed rolls 8 and 9, the paper passing between a blade electrode 11 and styli 12 mounted on a belt which cooperatively apply electrical marking signals to the paper. The paper feed rolls 8 and 9 and a sprocket wheel 14 for the belt are driven by a motor M through a suitably geared transmission 16.

As shown enlarged in FIGS. 2A to 4 each stylus 12 comprises a foot 16 with a toe 17 and a leg 18 integral with the foot and extending upwardly from a hinge 15 at the foot to a bend forming a scanning surface 19 which traverses the recording paper 6 in opposition to the blade electrode 11. The stylus 18 is attached to overlapping portions 13A and 13B of the belt 13 by an eyelet 21 set through perforations in each portion, as described fully in U.S. Pat. No. 4,060,815.

Figure 5:
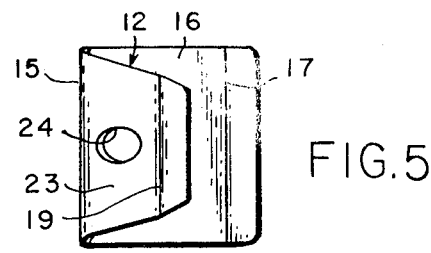
FIG. 5 is a plan view like FIG. 4 of an alternate form of stylus.
Figure 4:
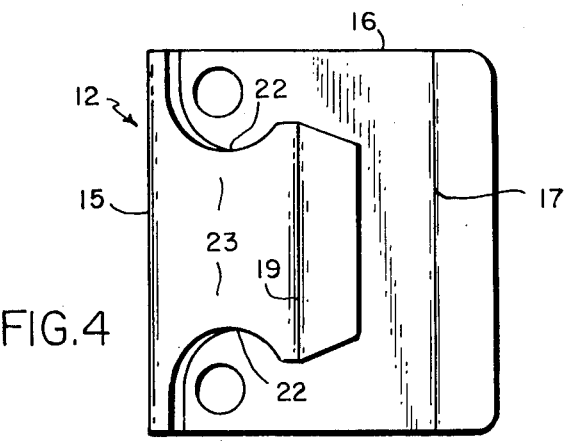
FIG. 4 is a plan view of the stylus.

While the styli 12 as so far described efficiently cooperate with the blade electrode 11 despite eroded irregularities in the electrode and variations in paper thickness by flexing at the hinge 15, more resilient movement of the recording surface 19 relative to the paper greatly improves the quality of the markings on the recording paper 6. According to one aspect of the invention the desired resilience of the leg 18 carrying the recording edge 19 is provided by reducing the cross section of an area of the leg 18. As shown in FIGS. 2A to 4 the cross section is reduced by cut-outs 22 which provide greater flexure in the mid-portion 23 on the leg 18 between the recording surface 19 and the foot 16 although the whole leg flexes from hinge 15 to edge 19. Alternatively, as shown in FIG. 5 the cross section of the leg area may be reduced by cutting out an aperture 24 inside the edges of the leg 18. A similar, prior stylus without the cut-out under a force of 60 to 80 grams will flex toward the belt 0.010 to 0.015 inch, a deflection which is insufficient to compensate for eroded irregularities along the blade electrode of the same order. With greater flexure at greater force the prior stylus either took a permanent set or passed its elastic limit and failed by breaking in operation. The present stylus with the cut-out will deflect 0.030 to 0.040 inch at 60 to 80 grams force without setting or breaking and will compensate for blade electrode irregularities to provide adequate and substantially even marking pressure across the blade electrode.

This greatly increased sensitivity of compliance with recording irregularities means that the lower recording pressure on the paper 6, and hence the smaller recording area will yield distinctly more clearly defined signal marking on the paper, that is, more easily read recordings.

Figures 2A, 2B:
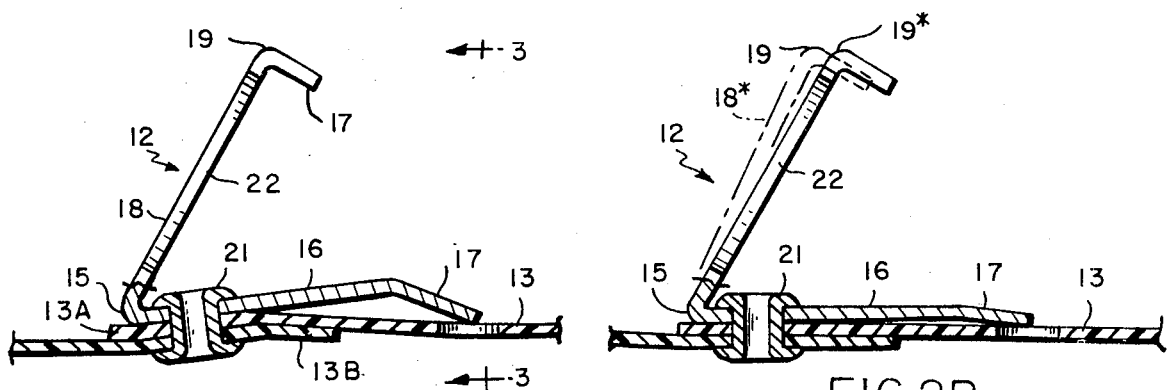
FIGS. 2A and 2B are enlarged cross sections of a stylus on a belt.
Figure 3:
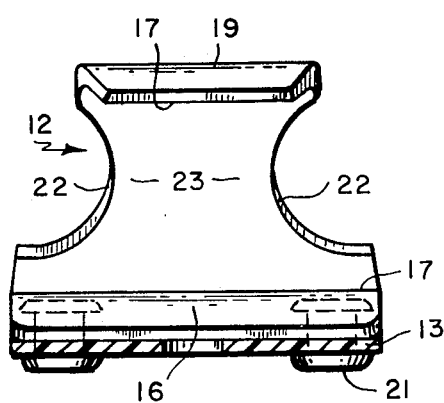
FIG. 3 is a front elevation of the belted stylus of FIG. 2A.

Another aspect of the invention concerns fine lengthwise adjustments of the styli recording edges 19 along the belt 13 so that the edges are equally spaced. Toward this object the toe 17 of the foot is adjusted in its inclination relative to the foot 16. As shown in FIGS. 2A and 2B flattening of the angle between the foot 16 and toe 17 allows a pivotting of the stylus about the eyelet 21, with a consequent shifting of the recording surface 19 lengthwise of the belt. This lengthwise shift is seen in FIG. 2B by comparison of the broken line position of the recording edge 19 with the solid adjusted position 19*, and is partly attributable to a reduction in curvature of the belt position in FIG. 2A and FIG. 2B.

Thus the provision of an additional hinge 23 for the leg 18 supporting the recording surface 19, and the toe 17 adjustment of the recording edge 19 lengthwise of the belt markedly improve the precision of recording facsimile signals on the paper 6 scanned by the belt styli 12.

It should be understood that the present disclosure is for the purpose of illustration only and that this invention includes all modifications and equivalents which fall within the scope of the appended claims.

I claim:

1. A stylus for a facsimile recorder scanning belt comprising:

a foot portion of springy sheet metal for attachment to a scanning belt, a metal sheet leg integral with and extending from the foot at an angle thereto a scanning surface, wherein the leg has an area of reduced cross section intermediate the foot and the scanning surface.

2. A stylus according to claim 1 wherein the leg is diminished in width intermediate the foot and the scanning surface.

3. A stylus according to claim 1 wherein the leg is flexibly hinged to the foot by a flexible integral hinge portion.

4. A stylus according to claim 3 wherein the foot includes means for attachment to a scanning belt.

5. A stylus according to claim 1 wherein the foot has a toe bent at an angle to the foot.

6. A stylus according to claim 4 wherein the foot has a toe bent at an angle to the foot so as to incline the foot with respect to the belt.

7. A stylus according to claim 4 mounted on a belt at said attachment means.

8. A stylus according to claim 7 mounted on a belt wherein the foot of the stylus has a toe bent with respect to the foot to adjust the lengthwise position of the stylus scanning surface with respect to the belt.

9. A stylus according to claim 1 wherein the cross section of an intermediate portion of the leg is reduced with respect to the same cross section through a straight sided area defined by and located between the scanning surface and the foot.

* * * * *